US010882779B2

(12) United States Patent
Zhao et al.

(10) Patent No.: US 10,882,779 B2
(45) Date of Patent: Jan. 5, 2021

(54) INORGANIC FIBER

(71) Applicant: Unifrax I LLC, Tonawanda, NY (US)

(72) Inventors: Donghui Zhao, Amherst, NY (US); Bruce K. Zoitos, Williamsville, NY (US); Michael J. Andrejcak, Tonawanda, NY (US); Jason M. Hamilton, Lancaster, NY (US)

(73) Assignee: UNIFRAX I LLC, Tonawanda, NY (US)

( * ) Notice: Subject to any disclaimer, the term of this patent is extended or adjusted under 35 U.S.C. 154(b) by 232 days.

(21) Appl. No.: 15/990,237

(22) Filed: May 25, 2018

(65) Prior Publication Data

US 2019/0360630 A1 Nov. 28, 2019

(51) Int. Cl.
*C03C 13/00* (2006.01)
*C04B 35/622* (2006.01)
*F16L 59/02* (2006.01)

(52) U.S. Cl.
CPC ............ *C03C 13/006* (2013.01); *C03C 13/00* (2013.01); *C03C 13/001* (2013.01); *C04B 35/6224* (2013.01); *C04B 2235/3206* (2013.01); *C04B 2235/3217* (2013.01); *C04B 2235/3262* (2013.01); *C04B 2235/3275* (2013.01); *F16L 59/02* (2013.01)

(58) Field of Classification Search
CPC ......... C03C 13/00; C03C 13/01; C03C 13/06; C04B 35/14; C04B 35/6224; C04B 2235/3272; C04B 2235/3208; C04B 2235/3275; C04B 2235/3206; C04B 2235/3217; C04B 2235/9615; C04B 2235/3262; C04B 2235/3409; C04B 2235/72; F16L 59/02
See application file for complete search history.

(56) References Cited

U.S. PATENT DOCUMENTS

| | | |
|---|---|---|
| 1,759,919 A | 5/1930 | Singer |
| 2,051,279 A | 8/1936 | Thorndyke |
| 2,335,220 A | 11/1943 | Edwards |
| 2,576,312 A | 11/1951 | Minnick |
| 2,690,393 A | 9/1954 | McGarvey |
| 2,693,668 A | 11/1954 | Slayter |
| 2,699,415 A | 1/1955 | Nachtman |
| 2,710,261 A | 6/1955 | McMullen |
| 2,876,120 A | 3/1959 | Machlan |
| 2,877,124 A | 3/1959 | Welsh |
| 3,112,184 A | 11/1963 | Hollenbach |
| 3,166,428 A | 1/1965 | Thomas |
| 3,348,994 A | 10/1967 | Rees et al. |
| 3,380,818 A | 4/1968 | Smith |
| 3,383,275 A | 5/1968 | Croop et al. |
| 3,402,055 A | 9/1968 | Harris et al. |
| 3,455,731 A | 7/1969 | Nielsen et al. |
| 3,458,329 A | 7/1969 | Owens et al. |
| 3,459,568 A | 8/1969 | Rinehart |
| 3,469,729 A | 9/1969 | Grekila et al. |
| 3,597,179 A | 8/1971 | Simmons |
| 3,687,850 A | 8/1972 | Gagin |
| 3,783,092 A | 1/1974 | Majumdar |
| 3,785,836 A | 1/1974 | Bacon |
| 3,788,885 A | 1/1974 | Birchall et al. |
| 3,799,836 A | 3/1974 | Rogers et al. |
| 3,804,608 A | 4/1974 | Gaskell et al. |
| 3,804,646 A | 4/1974 | Dumbaugh, Jr. |
| 3,811,901 A | 5/1974 | Bacon |
| 3,854,986 A | 12/1974 | Chvalovsky et al. |
| 3,887,386 A | 6/1975 | Majumdar |
| 3,899,342 A | 8/1975 | Birchall et al. |
| 3,900,329 A | 8/1975 | Grubb et al. |
| 3,904,424 A | 9/1975 | Aoki et al. |
| 3,985,935 A | 10/1976 | Brodmann |
| 3,992,498 A | 11/1976 | Morton et al. |
| 4,002,482 A | 1/1977 | Coenen |
| 4,011,651 A | 3/1977 | Bradbury et al. |
| 4,036,654 A | 7/1977 | Yale et al. |
| 4,037,015 A | 7/1977 | Koike et al. |
| 4,078,939 A | 3/1978 | Schwochow |
| 4,102,692 A | 7/1978 | Schartau et al. |
| 4,104,355 A | 8/1978 | Dunn et al. |
| 4,118,239 A | 10/1978 | Gagin et al. |
| 4,194,914 A | 3/1980 | Moriya et al. |
| 4,243,421 A | 1/1981 | Makoto |
| 4,303,722 A | 12/1981 | Pilgrim |
| 4,317,575 A | 3/1982 | Cavicchio et al. |
| 4,330,628 A | 5/1982 | Cockram et al. |
| 4,345,430 A | 8/1982 | Pallo et al. |
| 4,358,500 A | 11/1982 | George et al. |
| 4,363,878 A | 12/1982 | Yamamoto et al. |
| 4,366,251 A | 12/1982 | Rapp |
| 4,375,493 A | 3/1983 | George et al. |

(Continued)

FOREIGN PATENT DOCUMENTS

| | | |
|---|---|---|
| CA | 1 271 785 A | 7/1990 |
| CA | 2017344 | 11/1990 |

(Continued)

OTHER PUBLICATIONS

International Search Report and Written Opinion, PCT/US19/32594, ISA/US, dated Jul. 17, 2019, 15 pages.

(Continued)

*Primary Examiner* — Elizabeth A. Bolden
(74) *Attorney, Agent, or Firm* — Haynes and Boone, LLP

(57) ABSTRACT

An inorganic fiber containing a fiberization product of a compound comprising at least one alkaline earth silicate, at least one compound containing an element from group VII and/or IX of the periodic table, and optionally alumina and/or boria. The inclusion of a suitable amount of at least one compound containing an element from group VII and/or IX of the periodic table of elements to an alkaline-earth silicate inorganic fiber reduces fiber shrinkage, decreases biopersistence in physiological solutions, and enhances mechanical strength beyond that of alkaline earth silicate fibers without the presence of the at least one compound containing an element from group VII and/or IX. Also provided are methods of preparing the inorganic fiber and of thermally insulating articles using thermal insulation prepared from the inorganic fibers.

22 Claims, No Drawings

(56) References Cited

U.S. PATENT DOCUMENTS

| | | |
|---|---|---|
| 4,379,111 A | 4/1983 | Smith et al. |
| 4,382,104 A | 5/1983 | Smith et al. |
| 4,387,180 A | 6/1983 | Jen et al. |
| 4,396,661 A | 8/1983 | George et al. |
| 4,428,999 A | 1/1984 | George et al. |
| 4,461,840 A | 7/1984 | Massol |
| 4,492,722 A | 1/1985 | Ritter, II et al. |
| 4,507,355 A | 3/1985 | George et al. |
| 4,542,106 A | 9/1985 | Sproull |
| 4,547,403 A | 10/1985 | Smith |
| 4,558,015 A | 12/1985 | Ekdahl et al. |
| 4,563,219 A | 1/1986 | George et al. |
| 4,604,097 A | 8/1986 | Graves et al. |
| 4,613,577 A | 9/1986 | Tagai et al. |
| 4,615,988 A | 10/1986 | Le Moigne et al. |
| 4,659,610 A | 4/1987 | George et al. |
| 4,673,594 A | 6/1987 | Smith |
| 4,735,857 A | 4/1988 | Tagai et al. |
| 4,737,192 A | 4/1988 | Smith |
| 4,778,499 A | 10/1988 | Beaver |
| 4,820,573 A | 4/1989 | Tagai et al. |
| 4,830,989 A | 5/1989 | Trivedi et al. |
| 4,867,779 A | 9/1989 | Meunier et al. |
| 4,882,302 A | 11/1989 | Horiuchi et al. |
| 4,933,307 A | 6/1990 | Marshall et al. |
| 5,037,470 A | 8/1991 | Matzen et al. |
| 5,055,428 A | 10/1991 | Porter |
| 5,064,785 A | 11/1991 | Kawamoto et al. |
| 5,108,957 A | 4/1992 | Cohen et al. |
| 5,145,734 A | 9/1992 | Ito et al. |
| 5,221,558 A | 6/1993 | Sonuparlak et al. |
| 5,223,336 A | 6/1993 | Griffith et al. |
| 5,250,488 A | 10/1993 | Thelohan et al. |
| 5,284,807 A | 2/1994 | Komori et al. |
| 5,312,806 A | 5/1994 | Mogensen |
| 5,332,699 A | 7/1994 | Olds et al. |
| 5,346,575 A | 9/1994 | Griffith et al. |
| 5,346,868 A | 9/1994 | Eschner |
| 5,371,050 A | 12/1994 | Belitskus et al. |
| 5,384,188 A | 1/1995 | Lebold et al. |
| 5,389,716 A | 2/1995 | Graves |
| 5,401,693 A | 3/1995 | Bauer et al. |
| 5,420,087 A | 5/1995 | Wieland et al. |
| 5,480,676 A | 1/1996 | Sonuparlak et al. |
| 5,486,232 A | 1/1996 | Griffith et al. |
| 5,552,213 A | 9/1996 | Eschner |
| 5,569,629 A | 10/1996 | Teneyck et al. |
| 5,576,252 A | 11/1996 | Rapp et al. |
| 5,580,532 A | 12/1996 | Robinson et al. |
| 5,583,080 A | 12/1996 | Guldberg et al. |
| 5,585,312 A | 12/1996 | Teneyck et al. |
| 5,591,516 A | 1/1997 | Jaco et al. |
| 5,603,887 A | 2/1997 | Eschner |
| RE35,557 E | 7/1997 | Thelohan et al. |
| 5,691,255 A | 11/1997 | Jensen et al. |
| 5,714,421 A | 2/1998 | Olds et al. |
| 5,811,360 A | 9/1998 | Jubb |
| 5,821,183 A | 10/1998 | Jubb |
| 5,843,854 A | 12/1998 | Karppinen et al. |
| 5,858,465 A | 1/1999 | Hunt et al. |
| 5,874,375 A | 2/1999 | Zoitos et al. |
| 5,928,075 A | 7/1999 | Miya et al. |
| 5,932,500 A | 8/1999 | Jensen et al. |
| 5,935,886 A | 8/1999 | Jensen et al. |
| 5,955,389 A | 9/1999 | Jubb |
| 5,962,354 A | 10/1999 | Fyles et al. |
| 5,968,648 A | 10/1999 | Rapp et al. |
| 5,994,247 A | 11/1999 | Jubb et al. |
| 5,998,315 A | 12/1999 | Jubb |
| 6,013,592 A | 1/2000 | Merrill et al. |
| 6,025,288 A | 2/2000 | Zoitos et al. |
| 6,030,910 A | 2/2000 | Zoitos et al. |
| 6,036,762 A | 3/2000 | Sambasivan |
| 6,037,284 A | 3/2000 | Holstein et al. |
| 6,037,288 A | 3/2000 | Robinson et al. |
| 6,043,170 A | 3/2000 | Steinkopf et al. |
| 6,156,683 A | 12/2000 | Grove-Rasmussen et al. |
| 6,180,546 B1 | 1/2001 | Jubb et al. |
| 6,284,684 B1 | 9/2001 | Vignesoult et al. |
| 6,309,994 B1 | 10/2001 | Marra et al. |
| 6,313,050 B1 | 11/2001 | De Meringo et al. |
| 6,346,494 B1 | 2/2002 | Jensen et al. |
| 6,358,872 B1 | 3/2002 | Karppinen et al. |
| 6,458,436 B1 | 10/2002 | Hansen et al. |
| 6,461,415 B1 | 10/2002 | Sambasivan et al. |
| 6,517,906 B1 | 2/2003 | Economy et al. |
| 6,551,951 B1 | 4/2003 | Fay et al. |
| 6,652,950 B2 | 11/2003 | Barney et al. |
| 6,716,407 B2 | 4/2004 | Davis et al. |
| 6,855,298 B2 | 2/2005 | Teneyck |
| 6,861,381 B1 | 3/2005 | Jubb et al. |
| 6,897,173 B2 | 5/2005 | Bernard et al. |
| 6,953,757 B2 | 10/2005 | Zoitos et al. |
| 7,153,796 B2 | 12/2006 | Jubb et al. |
| 7,160,824 B2 | 1/2007 | Zguris et al. |
| 7,259,118 B2 | 8/2007 | Jubb et al. |
| 7,468,336 B2 | 12/2008 | Zoitos et al. |
| 7,468,337 B2 | 12/2008 | Zoitos et al. |
| 7,470,641 B2 | 12/2008 | Jubb et al. |
| 7,550,118 B2 | 6/2009 | Merry et al. |
| 7,567,817 B2 | 7/2009 | Liu et al. |
| 7,638,447 B2 | 12/2009 | Bernard et al. |
| 7,651,965 B2 | 1/2010 | Jubb et al. |
| 7,704,902 B2 | 4/2010 | Maquin et al. |
| 7,709,027 B2 | 5/2010 | Fechner et al. |
| 7,781,043 B2 | 8/2010 | Nakayama et al. |
| 7,781,372 B2 | 8/2010 | Liu et al. |
| 7,803,729 B2 | 9/2010 | Keller et al. |
| 7,875,566 B2 | 1/2011 | Freeman et al. |
| 7,887,917 B2 | 2/2011 | Zoitos et al. |
| 7,897,255 B2 | 3/2011 | Liu et al. |
| 8,026,190 B2 | 9/2011 | Keller et al. |
| 8,147,952 B2 | 4/2012 | Iwamoto et al. |
| 8,163,377 B2 | 4/2012 | Wainwright et al. |
| 8,551,897 B2 | 10/2013 | Zoitos et al. |
| 8,877,102 B2 | 11/2014 | Bernard et al. |
| 2002/0022567 A1 | 2/2002 | Li et al. |
| 2002/0032116 A1 | 3/2002 | Jubb et al. |
| 2002/0045528 A1 | 4/2002 | Kusuno et al. |
| 2002/0107133 A1 | 8/2002 | Troczynski et al. |
| 2003/0015003 A1 | 1/2003 | Fisler et al. |
| 2003/0049329 A1 | 3/2003 | Lee et al. |
| 2003/0126802 A1 | 7/2003 | Rosenflanz et al. |
| 2003/0138673 A1 | 7/2003 | Sambasivan et al. |
| 2003/0162019 A1 | 8/2003 | Zoitos et al. |
| 2003/0181306 A1 | 9/2003 | Bernard et al. |
| 2004/0011245 A1 | 1/2004 | Sambasivan et al. |
| 2004/0092379 A1 | 5/2004 | Lewis |
| 2005/0013873 A1 | 1/2005 | Fechner et al. |
| 2005/0032620 A1 | 2/2005 | Zoitos et al. |
| 2005/0079970 A1 | 4/2005 | Otaki et al. |
| 2005/0085369 A1 | 4/2005 | Jensen |
| 2005/0268656 A1 | 12/2005 | Raichel et al. |
| 2006/0094583 A1 | 5/2006 | Freeman et al. |
| 2006/0211562 A1 | 9/2006 | Fisler et al. |
| 2007/0020454 A1 | 1/2007 | Zoitos et al. |
| 2008/0146430 A1 | 6/2008 | Li et al. |
| 2008/0191179 A1 | 8/2008 | Bernard et al. |
| 2009/0053510 A1 | 2/2009 | Jubb |
| 2009/0130937 A1 | 5/2009 | Wainwright et al. |
| 2009/0208428 A1 | 8/2009 | Hill et al. |
| 2010/0093510 A1 | 4/2010 | Tanaka et al. |
| 2010/0184581 A1 | 7/2010 | Berthereau et al. |
| 2010/0209306 A1 | 8/2010 | Kunze et al. |
| 2010/0298110 A1 | 11/2010 | Richter et al. |
| 2011/0118102 A1 | 5/2011 | Zoitos et al. |
| 2011/0172077 A1 | 7/2011 | Lewis |
| 2012/0160104 A1 | 6/2012 | Vulfson et al. |
| 2012/0247156 A1 | 10/2012 | Kitahara et al. |
| 2013/0225025 A1 | 8/2013 | McGinnis et al. |
| 2013/0333594 A1 | 12/2013 | Berthereau et al. |
| 2015/0163861 A1 | 6/2015 | Mihara et al. |

(56) References Cited

U.S. PATENT DOCUMENTS

| | | | |
|---|---|---|---|
| 2015/0259243 A1 | 9/2015 | McGinnis et al. | |
| 2015/0291767 A1* | 10/2015 | Owada | C03C 12/00 524/611 |
| 2017/0121861 A1 | 5/2017 | Zoitos et al. | |

FOREIGN PATENT DOCUMENTS

| | | |
|---|---|---|
| CA | 2043699 | 12/1991 |
| CA | 2167077 A1 | 12/1995 |
| EP | 0 074 655 A1 | 3/1983 |
| EP | 0132078 | 1/1985 |
| EP | 0 142 715 A2 | 5/1985 |
| EP | 0 146 398 A2 | 6/1985 |
| EP | 0 155 550 A1 | 9/1985 |
| EP | 0 159 173 A1 | 10/1985 |
| EP | 0 178 688 A2 | 4/1986 |
| EP | 0 178 689 A2 | 4/1986 |
| EP | 0 186 128 A2 | 7/1986 |
| EP | 0 222 478 A1 | 5/1987 |
| EP | 0 302 465 A2 | 2/1989 |
| EP | 0 417 493 A2 | 3/1991 |
| EP | 0 427 873 A1 | 5/1991 |
| EP | 0 539 342 A1 | 4/1993 |
| EP | 0 834 489 A1 | 4/1998 |
| EP | 1 086 936 A2 | 3/2001 |
| EP | 1 323 687 A2 | 7/2003 |
| EP | 1 908 737 A1 | 4/2008 |
| EP | 2 634 308 B1 | 3/2016 |
| FR | 2662687 | 12/1991 |
| GB | 520247 | 4/1940 |
| GB | 1 360 197 | 7/1974 |
| GB | 1 360 198 | 7/1974 |
| GB | 1 360 199 | 7/1974 |
| GB | 1 360 200 | 7/1974 |
| GB | 2 200 129 A | 7/1988 |
| GB | 2 383 793 | 7/2003 |
| JP | S58-46121 A | 3/1983 |
| JP | 3132234 B2 | 2/2001 |
| JP | 2004-036050 A | 2/2004 |
| JP | 2005-089913 A | 4/2005 |
| JP | 2006-272116 A | 10/2006 |
| JP | 07-033546 A2 | 2/2007 |
| JP | 3938671 B2 | 6/2007 |
| JP | 07-303011 A | 11/2007 |
| JP | 2011-105554 A | 6/2011 |
| KR | 10-2004-0013846 A | 7/2010 |
| KR | 10-2010-0084917 A | 7/2010 |
| WO | WO 85/02393 A | 6/1985 |
| WO | WO 85/02394 A1 | 6/1985 |
| WO | WO 87/05007 A1 | 8/1987 |
| WO | WO 89/12032 A2 | 12/1989 |
| WO | WO 90/02713 A1 | 3/1990 |
| WO | WO 92/07801 A1 | 5/1992 |
| WO | WO 92/09536 A1 | 6/1992 |
| WO | WO 93/15028 A1 | 8/1993 |
| WO | WO 94/15883 A1 | 7/1994 |
| WO | WO 95/32926 A1 | 12/1995 |
| WO | WO 96/05147 A1 | 2/1996 |
| WO | WO 97/16386 A1 | 5/1997 |
| WO | WO 98/32606 A1 | 7/1998 |
| WO | WO 98/51981 A1 | 11/1998 |
| WO | WO 02/16263 A1 | 2/2002 |
| WO | WO 03/031368 A2 | 4/2003 |
| WO | WO 03/050054 A1 | 6/2003 |
| WO | WO 03/059835 A1 | 7/2003 |
| WO | WO 2006/048610 A1 | 5/2006 |
| WO | WO 2007/005836 A2 | 1/2007 |
| WO | WO 2015/100320 A1 | 7/2015 |

OTHER PUBLICATIONS

Wallenburger, et al. "Inviscid melt spinning: As-spun crystalline alumina fibers", J. Mater. Res., vol. 5, No. 11, Nov. 1990.

Shyu, Jiin-Jyh and Wu, Jenn-Ming, Effect of $TiO_2$ addition on the nucleation of apatite in an $MgO$—$CaO$—$SiO$—$P_2O_5$ glass, Journal of Materials Science Letters, vol. 10, 1991.

Shelby, J.E., Introduction to Glass Science and Technology, 1997, The Royal Society of Chemistry, p. 109.

* cited by examiner

INORGANIC FIBER

TECHNICAL FIELD

A high temperature resistant inorganic fiber that is useful as thermal, electrical or acoustical insulating material, and which has a continuous use temperature of 1260° C. and greater is provided. The high temperature resistant inorganic fiber is easily manufacturable, exhibits low linear shrinkage after exposure to use temperatures, retains good mechanical strength after continued exposure to use temperatures, and exhibits low biopersistence in physiological fluids.

BACKGROUND

The insulation material industry has determined that it is desirable to utilize fibers in thermal, electrical and acoustical insulating applications, which do not persist in physiological fluids. That is, fiber compositions which exhibit a low biopersistence or a high solubility in physiological fluids.

While candidate materials have been proposed, the use temperature limit of these materials have not been high enough to accommodate many of the applications to which high temperature resistant fibers are applied. For example, such low biopersistence fibers exhibit high shrinkage at use temperatures and/or reduced mechanical strength when exposed to use temperatures ranging from 1000° C. to 1500° C. as compared to the performance of refractory ceramic fibers.

The high temperature resistant, low biopersistence fibers should exhibit minimal shrinkage at expected exposure temperatures, and after prolonged or continuous exposure to the expected use temperatures, in order to provide effective thermal protection to the article being insulated.

In addition to temperature resistance as expressed by shrinkage characteristics that are important in fibers that are used in insulation, it is also required that the fibers have mechanical strength characteristics during and following exposure to the use temperature, that will permit the fiber to maintain its structural integrity and insulating characteristics in use. One characteristic of the mechanical integrity of a fiber is its compression recovery. Compression recovery may be measured by firing test pads manufactured from the inorganic fiber material to the test temperature for the selected period of time. The fired test pads are thereafter compressed to half of their original thickness and allowed to rebound. The amount of rebound is measured as percent recovery of the compressed thickness of the pad.

It is desirable to produce an improved inorganic fiber composition that is readily manufacturable from a fiberizable melt of desired ingredients, which exhibits low biopersistence in physiological fluids, low shrinkage during and after exposure to use temperatures of 1260° C. and greater, such as 1400° C. and greater, and, which exhibits low brittleness after exposure to the expected use temperatures, and which maintains mechanical integrity after exposure to use temperatures of 1260° C. and greater, such as 1400° C. and greater.

SUMMARY

Provided is a high temperature resistant alkaline-earth silicate fiber exhibiting improved thermal stability when the inorganic fiber is exposed to elevated temperatures of 1260° C. and greater. It has been found that the inclusion of a suitable amount of at least one compound containing an element from group VII and/or IX of the periodic table of elements to an alkaline-earth silicate inorganic fiber reduces fiber shrinkage and enhances mechanical strength beyond that of alkaline earth silicate fibers without the presence of the at least one compound containing an element from group VII and/or IX of the periodic table. The fiber exhibits low biopersistence in physiological solutions, reduced linear shrinkage, and improved mechanical strength after exposure to expected use temperatures.

DETAILED DESCRIPTION

According to certain embodiments, the inorganic fiber comprises the fiberization product of a compound comprising at least one alkaline earth silicate and at least one compound containing an element from group VII and/or IX of the periodic table.

According to certain embodiments, the inorganic fiber comprises the fiberization product of silica, magnesia and at least one compound containing an element from group VII and/or IX of the periodic table.

According to certain embodiments, the inorganic fiber comprises the fiberization product of silica, magnesia, at least one compound containing an element from group VII and/or IX of the periodic table, and substantially no alkali metal oxide.

According to certain embodiments, the inorganic fiber comprises the fiberization product of silica, magnesia, at least one compound containing an element from group VII and/or IX of the periodic table, and 1 weight percent or less calcia.

According to certain embodiments, the inorganic fiber comprises the fiberization product of silica, magnesia and manganese oxide. According to certain embodiments, the inorganic fiber comprises the fiberization product of silica, magnesia, manganese oxide, and substantially no alkali metal oxide. According to certain embodiments, the inorganic fiber comprises the fiberization product of silica, magnesia, manganese oxide, and 1 weight percent or less calcia.

According to certain embodiments, the inorganic fiber comprises the fiberization product of silica, magnesia and cobalt oxide. According to certain embodiments, the inorganic fiber comprises the fiberization product of silica, magnesia, cobalt oxide, and substantially no alkali metal oxide. According to certain embodiments, the inorganic fiber comprises the fiberization product of silica, magnesia, cobalt oxide, and 1 weight percent or less calcia.

According to certain embodiments, the inorganic fiber comprises the fiberization product of silica, magnesia and at least one of manganese oxide or cobalt oxide.

According to certain embodiments, the inorganic fiber comprises the fiberization product of silica, magnesia, calcia and at least one compound containing an element from group VII and/or IX of the periodic table.

According to certain embodiments, the inorganic fiber comprises the fiberization product of silica, magnesia, calcia, alumina and at least one compound containing an element from group VII and/or IX of the periodic table.

According to certain embodiments, the inorganic fiber comprises the fiberization product of silica, magnesia, calcia, alumina, at least one compound containing an element from group VII and/or IX of the periodic table, and substantially no alkali metal oxide.

According to certain embodiments, the inorganic fiber comprises the fiberization product of silica, magnesia, calcia, alumina, iron oxide, at least one compound containing an element from group VII and/or IX of the periodic table, and substantially no alkali metal oxide.

According to certain embodiments, the inorganic fiber comprises the fiberization product of silica, calcia and at least one compound containing an element from group VII and/or IX of the periodic table. According to certain embodiments, the inorganic fiber comprises the fiberization product of silica, calcia and manganese oxide. According to certain embodiments, the inorganic fiber comprises the fiberization product of silica, calcia, manganese oxide, and substantially no alkali metal oxide. According to certain embodiments, the inorganic fiber comprises the fiberization product of silica, calcia and cobalt oxide. According to certain embodiments, the inorganic fiber comprises the fiberization product of silica, calcia, cobalt oxide, and substantially no alkali metal oxide. According to certain embodiments, the inorganic fiber comprises the fiberization product of silica, calcia and at least one of manganese oxide or cobalt oxide.

It should be understood that when a range of values is described in the present disclosure, it is intended that any and every value within the range, including the end points, is to be considered as having been disclosed. For example, "a range of from 65 to 86 silica" is to be read as indicating each and every possible number along the continuum between 65 and 86. It is to be understood that the inventors appreciate and understand that any and all values within the range are to be considered to have been specified, and that the inventors have possession of the entire range and all the values within the range.

In the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" of a recited value produces the desired degree of effectiveness in the compositions and/or methods of the present disclosure. One of ordinary skill in the art would further understand that the metes and bounds of "about" with respect to the value of a percentage, amount or quantity of any component in an embodiment can be determined by varying the value, determining the effectiveness of the compositions for each value, and determining the range of values that produce compositions with the desired degree of effectiveness in accordance with the present disclosure. The term "about" is further used to reflect the possibility that a composition may contain trace components of other materials that do not alter the effectiveness or safety of the composition.

In the present disclosure, the term "substantially" refers to a degree of deviation that is sufficiently small so as to not measurably detract from the identified property or circumstance. The exact degree of deviation allowable may in some cases depend on the specific context. The phrase "substantially free" means that the composition excludes any amount more than trace impurities that are not intentionally added to the fiber melt, but which may be present in the raw starting materials from which the fibers are produced. In certain embodiments, the phrase "substantially free" means that the composition excludes that component.

The compositional weight percentages disclosed herein are based on the total weight of the fiber. It will be understood to one of ordinary skill in the art that the total weight percent of the fiber cannot exceed 100%. For example, a person of ordinary skill in the art would easily recognize and understand that a fiber composition comprising 65 to 86 weight percent silica, 14 to 35 weight percent magnesia, 0.1 to 5 weight percent calcia, and 0.1 to 2 weight percent manganese oxide will not exceed 100%. A person of ordinary skill in the art would understand that the amount of silica and magnesia will be adjusted to include the desired amount of silica, magnesia, calcia and manganese oxide without exceeding 100% by weight of the fiber.

According to certain illustrative embodiments, the inorganic fiber comprises the fiberization product of about 65 to about 86 weight percent silica, greater than 0 to about 35 weight percent magnesia, and at least one compound containing an element from group VII and/or IX of the periodic table.

According to certain illustrative embodiments, the inorganic fiber comprises the fiberization product of about 65 to about 86 weight percent silica, greater than 0 to about 35 weight percent magnesia, greater than 0 to about 35 weight percent calcia, and greater than 0 to about 10 weight percent of at least one compound containing an element from group VII and/or IX of the periodic table.

According to certain illustrative embodiments, the inorganic fiber comprises the fiberization product of about 65 to about 86 weight percent silica, about 10 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 70 to about 82 weight percent silica, about 10 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 72 to about 82 weight percent silica, about 10 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 74 to about 82 weight percent silica, about 10 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 74 to about 82 weight percent silica, about 15 to about 25 weight percent magnesia, and about 0.1 to about 10 weight percent of manganese oxide.

According to certain illustrative embodiments, the inorganic fiber comprises the fiberization product of about 74 to about 82 weight percent silica, about 15 to about 25 weight percent magnesia, and about 0.1 to about 10 weight percent of cobalt oxide.

According to certain illustrative embodiments, the inorganic fiber comprises the fiberization product of about 76 to about 82 weight percent silica, about 16 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 65 to about 86 weight percent silica, about 12 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 65 to about 86 weight percent silica, about 14 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 65 to about 86 weight percent silica, about 16 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 72 to about 86 weight percent silica, about 17 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 75 to about 86 weight percent silica, about 18 to about 25 weight percent magnesia, and about 0.1 to about 10 weight percent of at least one compound containing an element from group VII and/or IX of the periodic table.

According to certain illustrative embodiments, the inorganic fiber comprises the fiberization product of about 65 to about 86 weight percent silica, about 18 to about 22 weight percent magnesia, and about 0.1 to about 10 weight percent of at least one compound containing an element from group VII and/or IX of the periodic table.

According to certain illustrative embodiments, the inorganic fiber comprises the fiberization product of about 65 to about 86 weight percent silica, about 10 to about 25 weight percent magnesia, and about 0.1 to about 8 weight percent of at least one compound containing an element from group VII and/or IX of the periodic table.

According to certain illustrative embodiments, the inorganic fiber comprises the fiberization product of about 65 to about 86 weight percent silica, about 10 to about 25 weight percent magnesia, and about 0.1 to about 6 weight percent of at least one compound containing an element from group VII and/or IX of the periodic table.

According to certain illustrative embodiments, the inorganic fiber comprises the fiberization product of about 65 to about 86 weight percent silica, about 12 to about 25 weight percent magnesia, and about 0.1 to about 5 weight percent of at least one compound containing an element from group VII and/or IX of the periodic table.

According to certain illustrative embodiments, the inorganic fiber comprises the fiberization product of about 65 to about 86 weight percent silica, about 10 to about 25 weight percent magnesia, and about 0.1 to about 4 weight percent of at least one compound containing an element from group VII and/or IX of the periodic table.

According to certain illustrative embodiments, the inorganic fiber comprises the fiberization product of about 65 to about 86 weight percent silica, about 10 to about 25 weight percent magnesia, and about 0.1 to about 3 weight percent of at least one compound containing an element from group VII and/or IX of the periodic table.

According to certain illustrative embodiments, the inorganic fiber comprises the fiberization product of about 65 to about 86 weight percent silica, greater than 0 to about 35 weight percent magnesia, and about 0.1 to about 10 weight percent manganese oxide.

According to certain illustrative embodiments, the inorganic fiber comprises the fiberization product of about 65 to about 86 weight percent silica, greater than 0 to about 35 weight percent magnesia, and about 0.1 to about 8 weight percent manganese oxide.

According to certain illustrative embodiments, the inorganic fiber comprises the fiberization product of about 65 to about 86 weight percent silica, greater than 0 to about 35 weight percent magnesia, and about 0.1 to about 6 weight percent manganese oxide.

According to certain illustrative embodiments, the inorganic fiber comprises the fiberization product of about 65 to about 86 weight percent silica, greater than 0 to about 35 weight percent magnesia, and about 0.1 to about 5 weight percent manganese oxide.

According to certain illustrative embodiments, the inorganic fiber comprises the fiberization product of about 65 to about 86 weight percent silica, greater than 0 to about 35 weight percent magnesia, and about 0.1 to about 4 weight percent manganese oxide.

According to certain illustrative embodiments, the inorganic fiber comprises the fiberization product of about 65 to about 86 weight percent silica, greater than 0 to about 35 weight percent magnesia, and about 0.1 to about 3 weight percent manganese oxide.

According to certain illustrative embodiments, the inorganic fiber comprises the fiberization product of about 65 to about 86 weight percent silica, greater than 0 to about 35 weight percent magnesia, and about 0.1 to about 2 weight percent manganese oxide.

According to certain illustrative embodiments, the inorganic fiber comprises the fiberization product of about 65 to about 86 weight percent silica, greater than 0 to about 35 weight percent magnesia, and about 0.5 to about 5 weight percent manganese oxide.

According to certain illustrative embodiments, the inorganic fiber comprises the fiberization product of about 65 to about 86 weight percent silica, greater than 0 to about 35 weight percent magnesia, and about 0.75 to about 5 weight percent manganese oxide.

According to certain illustrative embodiments, the inorganic fiber comprises the fiberization product of about 65 to about 86 weight percent silica, greater than 0 to about 35 weight percent magnesia, and about 1 to about 5 weight percent manganese oxide.

According to certain illustrative embodiments, the inorganic fiber comprises the fiberization product of about 65 to about 86 weight percent silica, greater than 0 to about 35 weight percent magnesia, and about 1.25 to about 5 weight percent manganese oxide.

According to certain illustrative embodiments, the inorganic fiber comprises the fiberization product of about 65 to about 86 weight percent silica, greater than 0 to about 35 weight percent magnesia, and about 0.5 to about 3 weight percent manganese oxide.

According to certain illustrative embodiments, the inorganic fiber comprises the fiberization product of about 65 to about 86 weight percent silica, greater than 0 to about 35 weight percent magnesia, and about 0.75 to about 3 weight percent manganese oxide.

According to certain illustrative embodiments, the inorganic fiber comprises the fiberization product of about 72 to about 82 weight percent silica, about 12 to about 25 weight percent magnesia, and about 0.1 to about 10 weight percent manganese oxide.

According to certain illustrative embodiments, the inorganic fiber comprises the fiberization product of about 72 to about 82 weight percent silica, about 12 to about 25 weight percent magnesia, and about 0.1 to about 8 weight percent manganese oxide.

According to certain illustrative embodiments, the inorganic fiber comprises the fiberization product of about 72 to about 82 weight percent silica, about 12 to about 25 weight percent magnesia, and about 0.1 to about 6 weight percent manganese oxide.

According to certain illustrative embodiments, the inorganic fiber comprises the fiberization product of about 72 to about 82 weight percent silica, about 12 to about 25 weight percent magnesia, and about 0.1 to about 5 weight percent manganese oxide.

According to certain illustrative embodiments, the inorganic fiber comprises the fiberization product of about 72 to about 82 weight percent silica, about 12 to about 25 weight percent magnesia, and about 0.1 to about 4 weight percent manganese oxide.

According to certain illustrative embodiments, the inorganic fiber comprises the fiberization product of about 72 to about 82 weight percent silica, about 12 to about 25 weight percent magnesia, and about 0.1 to about 3 weight percent manganese oxide.

According to certain illustrative embodiments, the inorganic fiber comprises the fiberization product of about 72 to about 82 weight percent silica, about 12 to about 25 weight percent magnesia, and about 0.1 to about 2 weight percent manganese oxide.

According to certain illustrative embodiments, the inorganic fiber comprises the fiberization product of about 72 to about 82 weight percent silica, about 12 to about 25 weight percent magnesia, and about 0.5 to about 5 weight percent manganese oxide.

According to certain illustrative embodiments, the inorganic fiber comprises the fiberization product of about 72 to about 82 weight percent silica, about 12 to about 25 weight percent magnesia, and about 0.75 to about 5 weight percent manganese oxide.

According to certain illustrative embodiments, the inorganic fiber comprises the fiberization product of about 72 to about 82 weight percent silica, about 12 to about 25 weight percent magnesia, and about 1 to about 5 weight percent manganese oxide.

According to certain illustrative embodiments, the inorganic fiber comprises the fiberization product of about 72 to about 82 weight percent silica, about 12 to about 25 weight percent magnesia, and about 1.25 to about 5 weight percent manganese oxide.

According to certain illustrative embodiments, the inorganic fiber comprises the fiberization product of about 72 to about 82 weight percent silica, about 12 to about 25 weight percent magnesia, and about 0.5 to about 3 weight percent manganese oxide.

According to certain illustrative embodiments, the inorganic fiber comprises the fiberization product of about 72 to about 82 weight percent silica, about 12 to about 25 weight percent magnesia, and about 0.75 to about 3 weight percent manganese oxide.

According to certain illustrative embodiments, the inorganic fiber comprises the fiberization product of about 65 to about 86 weight percent silica, greater than 0 to about 35 weight percent magnesia, and about 0.1 to about 10 weight percent cobalt oxide.

According to certain illustrative embodiments, the inorganic fiber comprises the fiberization product of about 65 to about 86 weight percent silica, greater than 0 to about 35 weight percent magnesia, and about 0.1 to about 8 weight percent cobalt oxide.

According to certain illustrative embodiments, the inorganic fiber comprises the fiberization product of about 65 to about 86 weight percent silica, greater than 0 to about 35 weight percent magnesia, and about 0.1 to about 6 weight percent cobalt oxide.

According to certain illustrative embodiments, the inorganic fiber comprises the fiberization product of about 65 to about 86 weight percent silica, greater than 0 to about 35 weight percent magnesia, and about 0.1 to about 5 weight percent cobalt oxide.

According to certain illustrative embodiments, the inorganic fiber comprises the fiberization product of about 65 to about 86 weight percent silica, greater than 0 to about 35 weight percent magnesia, and about 0.1 to about 4 weight percent cobalt oxide.

According to certain illustrative embodiments, the inorganic fiber comprises the fiberization product of about 65 to about 86 weight percent silica, greater than 0 to about 35 weight percent magnesia, and about 0.1 to about 3 weight percent cobalt oxide.

According to certain illustrative embodiments, the inorganic fiber comprises the fiberization product of about 65 to about 86 weight percent silica, greater than 0 to about 35 weight percent magnesia, and about 0.1 to about 2 weight percent cobalt oxide.

According to certain illustrative embodiments, the inorganic fiber comprises the fiberization product of about 65 to about 86 weight percent silica, greater than 0 to about 35 weight percent magnesia, and about 0.5 to about 5 weight percent cobalt oxide.

According to certain illustrative embodiments, the inorganic fiber comprises the fiberization product of about 65 to about 86 weight percent silica, greater than 0 to about 35 weight percent magnesia, and about 0.75 to about 5 weight percent cobalt oxide.

According to certain illustrative embodiments, the inorganic fiber comprises the fiberization product of about 72 to about 82 weight percent silica, about 12 to about 25 weight percent magnesia, and about 0.1 to about 10 weight percent cobalt oxide.

According to certain illustrative embodiments, the inorganic fiber comprises the fiberization product of about 72 to about 82 weight percent silica, about 12 to about 25 weight percent magnesia, and about 0.1 to about 8 weight percent cobalt oxide.

According to certain illustrative embodiments, the inorganic fiber comprises the fiberization product of about 72 to about 82 weight percent silica, about 12 to about 25 weight percent magnesia, and about 0.1 to about 6 weight percent cobalt oxide.

According to certain illustrative embodiments, the inorganic fiber comprises the fiberization product of about 72 to about 82 weight percent silica, about 12 to about 25 weight percent magnesia, and about 0.1 to about 5 weight percent cobalt oxide.

According to certain illustrative embodiments, the inorganic fiber comprises the fiberization product of about 72 to about 82 weight percent silica, about 12 to about 25 weight percent magnesia, and about 0.1 to about 4 weight percent cobalt oxide.

According to certain illustrative embodiments, the inorganic fiber comprises the fiberization product of about 72 to about 82 weight percent silica, about 12 to about 25 weight percent magnesia, and about 0.1 to about 3 weight percent cobalt oxide.

According to certain illustrative embodiments, the inorganic fiber comprises the fiberization product of about 72 to about 82 weight percent silica, about 12 to about 25 weight percent magnesia, and about 0.1 to about 2 weight percent cobalt oxide.

According to certain illustrative embodiments, the inorganic fiber comprises the fiberization product of about 72 to about 82 weight percent silica, about 12 to about 25 weight percent magnesia, and about 0.5 to about 5 weight percent cobalt oxide.

According to certain illustrative embodiments, the inorganic fiber comprises the fiberization product of about 72 to about 82 weight percent silica, about 12 to about 25 weight percent magnesia, and about 0.75 to about 5 weight percent cobalt oxide.

According to certain illustrative embodiments, the inorganic fiber comprises the fiberization product of about 65 to about 86 weight percent silica, greater than 0 to about 35 weight percent magnesia, about 0.1 to about 5 weight percent manganese oxide, and about 0.1 to about 5 weight percent cobalt oxide.

According to certain illustrative embodiments, the inorganic fiber comprises the fiberization product of about 65 to about 86 weight percent silica, greater than 0 to about 35 weight percent magnesia, about 0.5 to about 5 weight percent manganese oxide, and about 0.5 to about 5 weight percent cobalt oxide.

According to certain illustrative embodiments, the inorganic fiber comprises the fiberization product of about 65 to about 86 weight percent silica, greater than 0 to about 35 weight percent magnesia, about 0.75 to about 5 weight percent manganese oxide, and about 0.75 to about 5 weight percent cobalt oxide.

According to certain illustrative embodiments, the inorganic fiber comprises the fiberization product of about 65 to about 86 weight percent silica, greater than 0 to about 35 weight percent magnesia, about 1 to about 5 weight percent manganese oxide, and about 1 to about 5 weight percent cobalt oxide.

According to certain illustrative embodiments, the inorganic fiber comprises the fiberization product of about 65 to about 86 weight percent silica, greater than 0 to about 35 weight percent magnesia, about 1.25 to about 5 weight percent manganese oxide, and about 1.25 to about 5 weight percent cobalt oxide.

According to certain illustrative embodiments, the inorganic fiber comprises the fiberization product of about 65 to about 86 weight percent silica, greater than 0 to about 35 weight percent magnesia, about 1.5 to about 5 weight percent manganese oxide, and about 1.5 to about 5 weight percent cobalt oxide.

According to certain illustrative embodiments, the inorganic fiber comprises the fiberization product of about 72 to about 82 weight percent silica, about 12 to about 25 weight percent magnesia, about 0.1 to about 5 weight percent manganese oxide, and about 0.1 to about 5 weight percent cobalt oxide.

According to certain illustrative embodiments, the inorganic fiber comprises the fiberization product of about 72 to about 82 weight percent silica, about 12 to about 25 weight percent magnesia, about 0.5 to about 5 weight percent manganese oxide, and about 0.5 to about 5 weight percent cobalt oxide.

According to certain illustrative embodiments, the inorganic fiber comprises the fiberization product of about 72 to about 82 weight percent silica, about 12 to about 25 weight percent magnesia, about 0.75 to about 5 weight percent manganese oxide, and about 0.75 to about 5 weight percent cobalt oxide.

According to certain illustrative embodiments, the inorganic fiber comprises the fiberization product of about 72 to about 82 weight percent silica, about 12 to about 25 weight percent magnesia, about 1 to about 5 weight percent manganese oxide, and about 1 to about 5 weight percent cobalt oxide.

According to certain illustrative embodiments, the inorganic fiber comprises the fiberization product of about 72 to about 82 weight percent silica, about 12 to about 25 weight percent magnesia, about 1.25 to about 5 weight percent manganese oxide, and about 1.25 to about 5 weight percent cobalt oxide.

According to certain illustrative embodiments, the inorganic fiber comprises the fiberization product of about 72 to about 82 weight percent silica, about 12 to about 25 weight percent magnesia, about 1.5 to about 5 weight percent manganese oxide, and about 1.5 to about 5 weight percent cobalt oxide.

According to certain illustrative embodiments, the inorganic fiber comprises the fiberization product of about 72 to about 82 weight percent silica, about 16 to about 30 weight percent magnesia, and about 0.1 to about 10 weight percent manganese oxide and/or cobalt oxide.

According to certain illustrative embodiments, the inorganic fiber comprises the fiberization product of about 74 to about 82 weight percent silica, about 16 to about 30 weight percent magnesia, and about 0.1 to about 10 weight percent manganese oxide and/or cobalt oxide.

According to certain illustrative embodiments, the inorganic fiber comprises the fiberization product of about 76 to about 82 weight percent silica, about 16 to about 30 weight percent magnesia, and about 0.1 to about 10 weight percent manganese oxide and/or cobalt oxide.

According to certain illustrative embodiments, the inorganic fiber comprises the fiberization product of about 70 to about 82 weight percent silica, about 16 to about 30 weight percent magnesia, and about 0.1 to about 5 weight percent manganese oxide and/or cobalt oxide.

According to certain illustrative embodiments, the inorganic fiber comprises the fiberization product of about 72 to about 82 weight percent silica, about 16 to about 30 weight percent magnesia, and about 0.5 to about 5 weight percent manganese oxide and/or cobalt oxide.

According to certain illustrative embodiments, the inorganic fiber comprises the fiberization product of about 72 to about 82 weight percent silica, about 16 to about 30 weight percent magnesia, and about 0.5 to about 4 weight percent manganese oxide and/or cobalt oxide.

According to certain illustrative embodiments, the inorganic fiber comprises the fiberization product of about 72 to about 82 weight percent silica, about 16 to about 30 weight percent magnesia, and about 1 to about 10 weight percent manganese oxide and/or cobalt oxide.

According to certain illustrative embodiments, the inorganic fiber comprises the fiberization product of about 72 to about 82 weight percent silica, about 16 to about 30 weight percent magnesia, and about 1 to about 4 weight percent manganese oxide and/or cobalt oxide.

According to certain illustrative embodiments, the inorganic fiber comprises the fiberization product of about 74 to about 82 weight percent silica, greater than 0 to about 35 weight percent magnesia, and about 0.1 to about 10 weight percent manganese oxide and/or cobalt oxide.

According to certain illustrative embodiments, the inorganic fiber comprises the fiberization product of about 76 to about 82 weight percent silica, greater than 0 to about 35 weight percent magnesia, and about 0.1 to about 10 weight percent manganese oxide and/or cobalt oxide.

According to certain illustrative embodiments, the inorganic fiber comprises the fiberization product of about 73 to about 82 weight percent silica, about 16 to about 25 weight percent magnesia, and about 0.1 to about 10 weight percent manganese oxide and/or cobalt oxide.

According to certain illustrative embodiments, the inorganic fiber comprises the fiberization product of about 72 to about 82 weight percent silica, about 14 to about 25 weight percent magnesia, and about 0.1 to about 10 weight percent manganese oxide and/or cobalt oxide.

According to certain illustrative embodiments, the inorganic fiber comprises the fiberization product of about 72 to about 82 weight percent silica, about 16 to about 25 weight percent magnesia, and about 0.1 to about 10 weight percent manganese oxide and/or cobalt oxide.

According to certain illustrative embodiments, the inorganic fiber comprises the fiberization product of about 72 to about 82 weight percent silica, about 17 to about 25 weight percent magnesia, and about 0.1 to about 10 weight percent manganese oxide and/or cobalt oxide.

According to any one of the disclosed embodiments, the inorganic fiber may further comprise a viscosity modifier. The viscosity modifiers may be present in the raw materials which supply the main components of the melt, or may, at least in part, be separately added. According to certain illustrative embodiments, the viscosity modifier can be selected from alumina, boria and/or zirconia.

According to certain illustrative embodiments, the inorganic fiber comprises the fiberization product of about 75 to about 82 weight percent silica, about 15 to about 25 weight percent magnesia, and manganese oxide and/or cobalt oxide, wherein the amount of manganese oxide and/or cobalt oxide may be selected from about 0.1 to about 10 weight percent, about 0.1 to about 8 weight percent, about 0.1 to about 6 weight percent, about 0.1 to about 5 weight percent, about 0.1 to about 4 weight percent, about 0.1 to about 3 weight percent, about 0.1 to about 2 weight percent, about 0.5 to about 10 weight percent, about 0.5 to about 5 weight percent, about 0.5 to about 4 weight percent, about 0.5 to about 3 weight percent, about 0.75 to about 10 weight percent, about 0.75 to about 5 weight percent, about 0.75 to about 4 weight percent, about 1 to about 10 weight percent, about 1 to about 5 weight percent, about 1 to about 4 weight percent, about 1.25 to about 10 weight percent, about 1.25 to about 5 weight percent, about 1.25 to about 4 weight percent, about 1.5 to about 10 weight percent, about 1.5 to about 5 weight percent, about 1.5 to about 4 weight percent.

In connection with all of the described embodiments of the inorganic fiber, a given fiber composition may contain an intended calcia addition in an amount of greater than 0 to about 10 weight percent, in an amount of greater than 0 to about 7.5 weight percent, in an amount of greater than 0 to about 7 weight percent, in an amount of greater than 0 to about 6.5 weight percent, in an amount of greater than 0 to about 6 weight percent, in an amount of greater than 0 to about 5.5 weight percent, in an amount of greater than 0 to about 5 weight percent, in an amount of greater than 0 to about 4.5 weight percent, in an amount of greater than 0 to about 4 weight percent, in an amount of greater than 0 to about 3.5 weight percent, in an amount of greater than 0 to about 3 weight percent, in an amount of greater than 0 to about 2.5 weight percent, in an amount of greater than 0 to about 2 weight percent, in an amount of greater than 0 to about 1.5 weight percent, in an amount of greater than 0 to about 1 weight percent, in an amount of greater than 0 to about 0.5 weight percent, in an amount of greater than 0 to about 0.25 weight percent, in an amount of about 0.1 to about 10 weight percent, in an amount of about 0.1 to about 9 weight percent, in an amount of about 0.1 to about 7.5 weight percent, in an amount of about 0.1 to about 7 weight percent, in an amount of about 0.1 to about 6.5 weight percent, in an amount of about 0.1 to about 6 weight percent, in an amount of about 0.1 to about 5.5 weight percent, in an amount of about 0.1 to about 5 weight percent, in an amount of about 0.1 to about 4.5 weight percent, in an amount of about 0.1 to about 4 weight percent, in an amount of about 0.1 to about 3.5 weight percent, in an amount of about 0.1 to about 3 weight percent, in an amount of about 0.1 to about 2.5 weight percent, in an amount of about 0.1 to about 2 weight percent, in an amount of about 0.1 to about 1.5 weight percent, in an amount of about 0.1 to about 1 weight percent, in an amount of about 0.1 to about 0.5 weight percent, in an amount of about 0.1 to about 10 weight percent, in an amount of about 0.1 to about 0.25 weight percent, in an amount of about 0.5 to about 10 weight percent, in an amount of about 0.5 to about 9 weight percent, in an amount of about 0.5 to about 7.5 weight percent, in an amount of about 0.5 to about 7 weight percent, in an amount of about 0.5 to about 6.5 weight percent, in an amount of about 0.5 to about 6 weight percent, in an amount of about 0.5 to about 5.5 weight percent, in an amount of about 0.5 to about 5 weight percent, in an amount of about 0.5 to about 4.5 weight percent, in an amount of about 0.5 to about 4 weight percent, in an amount of about 0.5 to about 3.5 weight percent, in an amount of about 0.5 to about 3 weight percent, in an amount of about 0.5 to about 2.5 weight percent, in an amount of about 0.5 to about 2 weight percent, in an amount of about 0.5 to about 1.5 weight percent, in an amount of about 0.5 to about 1 weight, in an amount of about 1 to about 10 weight percent, in an amount of about 1.5 to about 10 weight percent, in an amount of about 2 to about 10 weight percent, in an amount of about 2.5 to about 10 weight percent, in an amount of about 3 to about 10 weight percent, in an amount of about 3.5 to about 10 weight percent, in an amount of about 4 to about 10 weight percent, in an amount of about 1 to about 6 weight percent, in an amount of about 1.5 to about 6 weight percent, in an amount of about 2 to about 6 weight percent, in an amount of about 2.5 to about 6 weight percent, in an amount of about 3 to about 6 weight percent, in an amount of about 3.5 to about 6 weight percent, in an amount of about 4 to about 6 weight percent, or in an amount of about 5 to about 6.

In connection with all of the described embodiments of the inorganic fiber, a given fiber composition may contain alumina in an amount of greater than 0 to about 10 weight percent, in an amount of greater than 0 to about 7.5 weight percent, in an amount of greater than 0 to about 7 weight percent, in an amount of greater than 0 to about 6.5 weight percent, in an amount of greater than 0 to about 6 weight percent, in an amount of greater than 0 to about 5.5 weight percent, in an amount of greater than 0 to about 5 weight percent, in an amount of greater than 0 to about 4.5 weight percent, in an amount of greater than 0 to about 4 weight percent, in an amount of greater than 0 to about 3.5 weight percent, in an amount of greater than 0 to about 3 weight percent, in an amount of greater than 0 to about 2.5 weight percent, in an amount of greater than 0 to about 2 weight percent, in an amount of greater than 0 to about 1.5 weight percent, in an amount of greater than 0 to about 1 weight percent, in an amount of greater than 0 to about 0.5 weight percent, in an amount of greater than 0 to about 0.25 weight percent, in an amount of about 0.1 to about 5 weight percent, in an amount of about 0.1 to about 4.5 weight percent, in an amount of about 0.1 to about 4 weight percent, in an amount of about 0.1 to about 3.5 weight percent, in an amount of about 0.1 to about 3 weight percent, in an amount of about 0.1 to about 2.5 weight percent, in an amount of about 0.1 to about 2 weight percent, in an amount of about 0.1 to about 1.5 weight percent, in an amount of about 0.1 to about 1 weight percent, in an amount of about 0.1 to about 0.5 weight percent, in an amount of about 0.1 to about 10 weight percent, in an amount of about 0.1 to about 0.25 weight percent, in an amount of about 0.5 to about 10 weight percent, in an amount of about 0.5 to about 9 weight percent, in an amount of about 0.5 to about 7.5 weight percent, in an amount of about 0.5 to about 7 weight percent, in an amount of about 0.5 to about 6.5 weight percent, in an amount of about 0.5 to about 6 weight percent, in an amount of about 0.5 to about 5.5 weight percent, in an amount of about 0.5 to about 5 weight percent, in an amount of about 0.5 to about 4.5 weight percent, in an amount of about 0.5 to about 4 weight percent, in an amount of about 0.5 to about 3.5 weight percent, in an amount of about 0.5 to about 3 weight percent, in an amount of about 0.5 to about 2.5 weight percent, in an amount of about 0.5 to about 2 weight percent, in an amount of about 0.5 to about 1.5 weight percent, or in an amount of about 0.5 to about 1 weight.

According to any of the disclosed inorganic fiber compositions, the high temperature resistant inorganic fiber exhibits a linear shrinkage of 5% or less when exposed to a use temperature of 1260° C. or greater for 24 hours, and maintains mechanical integrity after exposure to the use temperature, and which exhibits low biopersistence in physiological fluids.

According to any of the disclosed inorganic fiber compositions, the high temperature resistant inorganic fiber exhibits a linear shrinkage of 5% or less when exposed to a use temperature of 1300° C. or greater for 24 hours, and maintains mechanical integrity after exposure to the use temperature, and which exhibits low biopersistence in physiological fluids.

According to any of the disclosed inorganic fiber compositions, the high temperature resistant inorganic fiber exhibits a linear shrinkage of 5% or less when exposed to a use temperature of 1350° C. or greater for 24 hours, and maintains mechanical integrity after exposure to the use temperature, and which exhibits low biopersistence in physiological fluids.

According to any of the disclosed inorganic fiber compositions, the high temperature resistant inorganic fiber exhibits a linear shrinkage of 5% or less when exposed to a use temperature of 1400° C. or greater for 24 hours, and maintains mechanical integrity after exposure to the use temperature, and which exhibits low biopersistence in physiological fluids.

According to any of the disclosed inorganic fiber compositions, the high temperature resistant inorganic fiber exhibits a linear shrinkage of 5% or less when exposed to a use temperature of 1450° C. or greater for 24 hours, and maintains mechanical integrity after exposure to the use temperature, and which exhibits low biopersistence in physiological fluids.

According to any of the disclosed inorganic fiber compositions, the high temperature resistant inorganic fiber exhibits a linear shrinkage of 5% or less when exposed to a use temperature of 1500° C. or greater for 24 hours, and maintains mechanical integrity after exposure to the use temperature, and which exhibits low biopersistence in physiological fluids.

According to any of the disclosed inorganic fiber compositions, provided is a high temperature resistant inorganic fiber which exhibits a linear shrinkage of less than 10% when exposed to a use temperature of 1400° C. or greater for 24 hours, and which maintains mechanical integrity after exposure to the use temperature, and which exhibits low biopersistence in physiological fluids.

According to any of the disclosed inorganic fiber compositions, provided is a high temperature resistant inorganic fiber which exhibits a linear shrinkage of less than 10% when exposed to a use temperature of 1450° C. or greater for 24 hours, and which maintains mechanical integrity after exposure to the use temperature, and which exhibits low biopersistence in physiological fluids.

According to any of the disclosed inorganic fiber compositions, provided is a high temperature resistant inorganic fiber which exhibits a linear shrinkage of less than 10% when exposed to a use temperature of 1500° C. or greater for 24 hours, and which maintains mechanical integrity after exposure to the use temperature, and which exhibits low biopersistence in physiological fluids.

Also provided is a method of making an inorganic fiber of any one of the above-described illustrative embodiments comprising (1) forming a molten melt of ingredients comprising silica, magnesia, and at least one compound containing an element from group VII and/or IX of the periodic table, optionally alumina and/or boria, and (2) forming fibers from the molten melt of ingredients.

According to certain embodiments, the method of making an inorganic fiber of any one of the above-described illustrative embodiment comprises (1) forming a molten melt of ingredients comprising silica, magnesia and at least one of manganese oxide and/or cobalt oxide, optionally alumina and/or boria, and (2) forming fibers from the molten melt of ingredients.

The method for preparing the fiber comprises forming a molten melt of ingredients comprising from about 65 to about 86 weight percent silica, greater than 0 to about 35 weight percent magnesia, and at least one of manganese oxide and/or cobalt oxide, and forming fibers from the molten melt of ingredients.

While several specific illustrative embodiments of the method of making the inorganic fiber have been recited hereinabove, it is to be noted that any amount of raw ingredients of the fiber compositions disclosed herein may be used in the method of making the fiber.

Also provided is a method of thermally insulating an article with fibrous insulation prepared from a plurality of the presently disclosed high temperature resistant low biopersistent inorganic fibers of any of the disclosed illustrative embodiments.

According to certain illustrative embodiments, the method includes disposing on, in, near or around the article to be thermally insulated, a thermal insulation material comprising a plurality of any one of the disclosed inorganic fibers comprising the fiberization product of silica, magnesia, and at least one compound containing an element from group VII and/or IX of the periodic table.

According to certain illustrative embodiments, the method includes disposing on, in, near or around the article to be thermally insulated, a thermal insulation material comprising a plurality of the inorganic fibers comprising the fiberization product of about 65 to about 86 weight percent silica, greater than 0 to about 35 weight percent magnesia, calcia, and at least one compound containing an element from group VII and/or IX of the periodic table.

Also provided is an inorganic fiber containing article comprising a plurality of the inorganic fibers of any one of the above-described illustrative embodiments in the form of blankets, blocks, boards, caulking compositions, cement compositions, coatings, felts, mats, moldable compositions, modules, papers, pumpable compositions, putty compositions, sheets, tamping mixtures, vacuum cast shapes, vacuum cast forms, or woven textiles (for example, without limitation, braids, cloths, fabrics, ropes, tapes, sleeving, wicking).

In order for a glass composition to be a viable candidate for producing a satisfactory high temperature resistant fiber product, the fiber to be produced must be manufacturable, sufficiently soluble (i.e., having low biopersistence) in physiological fluids, and capable of surviving high temperatures with minimal shrinkage and minimal loss of mechanical integrity during exposure to the high service temperatures.

The present inorganic fiber exhibits low biopersistence in physiological fluids. By "low biopersistence" in physiological fluids, it is meant that the inorganic fiber at least partially dissolves in such fluids, such as simulated lung fluid, during in vitro tests. Biopersistence may be tested by measuring the rate at which mass is lost from the fiber (ng/cm$^2$-hr) under conditions which simulate the temperature and chemical conditions found in the human lung. This test consists of exposing approximately 0.1 g of de-shotted fiber to 50 ml of simulated lung fluid ("SLF") for 6 hours. The entire test system is maintained at 37° C., to simulate the temperature of the human body.

After the SLF has been exposed to the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study.

To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 ng/cm$^2$-hr are considered indicative of a non-biopersistent fiber. The composition for the simulated lung fluid, which was used to test the durability of the fiber compositions of the present invention:

| Constituent | Amount/Make-up |
| --- | --- |
| $NH_4Cl$ | 10.72 g/50 mL |
| NaCl | 135.6 g |
| $NaHCO_3$ | 45.36 g |
| $NaH_2PO_4 \cdot H_2O$ solution | 3.31 g/50 mL |
| $Na_3C_6H_5O_7 \cdot H_2O$ solution | 1.18 g/50 mL |

-continued

| Constituent | Amount/Make-up |
| --- | --- |
| Glycine | 9.08 g |
| $H_2SO_4$ (1N solution) | 20.0 mL |
| $CaCl_2$ (2.75 wt. % solution) | 15.8 mL |
| Formaldehyde | 20.0 mL |

To approximately 18 liters of deionized water, sequentially add the above reagents in the amounts shown in the above table. Dilute the mixture to 20 liters with deionized water and continue to stir contents with magnetic stir bar or other suitable means for at least 15 minutes.

"Viscosity" refers to the ability of a glass melt to resist flow or shear stress. The viscosity-temperature relationship is critical in determining whether it is possible to fiberize a given glass composition. An optimum viscosity curve would have a low viscosity (5-500 poise) at the fiberization temperature and would gradually increase as the temperature decreased. If the melt is not sufficiently viscous (i.e. too thin) at the fiberization temperature, the result is a short, thin fiber, with a high proportion of unfiberized material (shot). If the melt is too viscous at the fiberization temperature, the resulting fiber will be extremely coarse (high diameter) and short.

Viscosity is dependent upon melt chemistry, which is also affected by elements or compounds that act as viscosity modifiers. Viscosity modifiers permit fibers to be blown or spun from the fiber melt. It is desirable, however, that such viscosity modifiers, either by type or amount, do not adversely impact the solubility, shrink resistance, or mechanical strength of the blown or spun fiber.

One approach to testing whether a fiber of a defined composition can be readily manufactured at an acceptable quality level is to determine whether the viscosity curve of the experimental chemistry matches that of a known product which can be easily fiberized. Viscosity-temperature profiles may be measured on a viscometer, capable of operating at elevated temperatures. In addition, an adequate viscosity profile may be inferred by routine experimentation, examining the quality of fiber (index, diameter, length) produced. The shape of the viscosity vs. temperature curve for a glass composition is representative of the ease with which a melt will fiberize and thus, of the quality of the resulting fiber (affecting, for example, the fiber's shot content, fiber diameter, and fiber length). Glasses generally have low viscosity at high temperatures. As temperature decreases, the viscosity increases. The value of the viscosity at a given temperature will vary as a function of the composition, as will the overall steepness of the viscosity vs. temperature curve. The present fiber melt composition possesses a viscosity profile of a readily manufacturable fiber.

Linear shrinkage of an inorganic fiber is a good measure of a fiber's dimensional stability at high temperatures or of its performance at a particular continuous service or use temperature. Fibers are tested for shrinkage by forming them into a mat and needle punching the mat together into a pad of approximately 4-10 pounds per cubic foot density and a thickness of about 1 inch. Such pads are cut into 3 inch×5 inch pieces and platinum pins are inserted into the face of the material. The separation distance of these pins is then carefully measured and recorded. The pad is then placed into a furnace, ramped to temperature and held at the temperature for a fixed period of time. After heating, the pin separation is again measured to determine the linear shrinkage that pad has experienced.

In one such test, the length and width of the fiber pads were carefully measured, and the pad was placed in a furnace and brought to a temperature of 1260° C. or 1400° C. for 24 or 168 hours. After cooling, the lateral dimensions were measured and the linear shrinkage was determined by comparing "before" and "after" measurements. If the fiber is available in blanket form, measurements may be made directly on the blanket without the need to form a pad.

Mechanical integrity is also an important property since the fiber must support its own weight in any application and must also be able to resist abrasion due to moving air or gas. Indications of fiber integrity and mechanical strength are provided by visual and tactile observations, as well as mechanical measurement of these properties of after-service temperature exposed fibers. The ability of the fiber to maintain its integrity after exposure to the use temperature may also be measured mechanically by testing for compression strength and compression recovery. These tests measure, respectively, how easily the pad may be deformed and the amount of resiliency (or compression recovery) the pad exhibits after a compression of 50%. Visual and tactile observations indicate that the present inorganic fiber remains intact and maintains its form after exposure to a use temperature of at least 1260° C. or 1400° C.

The low biopersistent inorganic fibers are made by standard glass and ceramic fiber manufacturing methods. Raw materials, such as silica and any suitable source of magnesia such as enstatite, forsterite, magnesia, magnesite, calcined magnesite, magnesium zirconate, periclase, steatite, or talc may be used. Any suitable manganese-bearing compound may be used as the source of manganese oxide. Any suitable cobalt-bearing compound may be used as the source of cobalt oxide. If zirconia is included in the fiber melt, any suitable source of zirconia, such as baddeleyite, magnesium zirconate, zircon or zirconia may be used. The materials are introduced into a suitable furnace where they are melted and blown using a fiberization nozzle, or spun, either in a batch or a continuous mode.

According to certain embodiments, the present inorganic fiber has an average diameter of 5 microns and greater.

The inorganic fibers according to any one of the disclosed embodiments are useful for thermal insulating applications at continuous service or operating temperatures of at least 1260° C., 1400° C. or greater. According to certain embodiments, the fibers containing an alkaline earth silicate in combination with manganese oxide and/or cobalt oxide are useful for thermal insulating applications at continuous service or operating temperatures of at least 1400° C. and it has been found that the magnesium-silicate fibers containing the manganese oxide and/or cobalt oxide additions do not melt until they are exposed to a temperature of 1500° C. or greater.

The inorganic fibers may be prepared by fiber blowing or fiber spinning techniques. A suitable fiber blowing technique includes the steps of mixing the starting raw materials containing magnesia, silica, manganese oxide and/or cobalt oxide, and optionally a further viscosity modifier, introducing the material mixture of ingredients into a suitable vessel or container, melting the material mixture of ingredients for discharge through a suitable nozzle, and blowing a high pressure gas onto the discharged flow of molten material mixture of ingredients to form the fibers.

A suitable fiber spinning technique includes the steps of mixing the starting raw materials together to form a material mixture of ingredients, introducing the material mixture of ingredients into a suitable vessel or container, melting the material mixture of ingredients for discharge through a suitable nozzle onto spinning wheels. The molten stream then cascades over the wheels, coating the wheels and being thrown off through centripetal forces, thereby forming fibers.

In some embodiments, the fiber is produced from a melt of raw materials by subjecting the molten stream to a jet of high pressure/high velocity air or by pouring the melt onto rapidly spinning wheels and spinning fiber centrifugally.

The fiber may be manufactured with existing fiberization technology and formed into multiple thermal insulation product forms, including but not limited to bulk fibers, fiber-containing blankets, boards, papers, felts, mats, blocks, modules, coatings, cements, moldable compositions, pumpable compositions, putties, ropes, braids, wicking, textiles (such as cloths, tapes, sleeving, string, yarns, etc. . . . ), vacuum cast shapes and composites. The fiber may be used in combination with conventional materials utilized in the production of fiber-containing blankets, vacuum cast shapes and composites, as a substitute for conventional refractory ceramic fibers. The fiber may be used alone or in combination with other materials, such as binders and the like, in the production of fiber-containing paper and felt.

The fiber may be easily melted by standard glass furnacing methods, fiberized by standard RCF fiberization equipment, and is not biopersistent in simulated body fluids.

The high temperature resistant inorganic fibers are readily manufacturable from a melt having an improved viscosity suitable for blowing or spinning fiber, are non-durable in physiological fluids, exhibit good mechanical strength up to the service temperature, exhibit excellent linear shrinkage up to 1400° C. and above and improved viscosity for fiberization.

EXAMPLES

The following examples are set forth to describe illustrative embodiments of the inorganic fibers in further detail and to illustrate the methods of preparing the inorganic fibers, preparing thermal insulating articles containing the fibers and using the fibers as thermal insulation. However, the examples should not be construed as limiting the fiber, the fiber containing articles, or the processes of making or using the fibers as thermal insulation in any manner.

Linear Shrinkage

A shrinkage pad was prepared by needling a fiber mat using a bank of felting needles. A 3 inch×5 inch test piece was cut from the pad and was used in the shrinkage testing. The length and width of the test pad was carefully measured. The test pad was then placed into a furnace and brought to a temperature of 1400° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

A second shrinkage pad was prepared in a manner similar to that disclosed for the first shrinkage pad. However, the second shrinkage pad was placed in a furnace and brought to a temperature of 1260° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

Compression Recovery

The ability of the inorganic fibers to retain mechanical strength after exposure to a use temperature was evaluated by a compression recovery test. Compression recovery is a measure of the mechanical performance of an inorganic fiber in response to the exposure of the fiber to a desired use temperature for a given period of time. Compression recovery is measured by firing test pads manufactured from the inorganic fiber material to the test temperature for the selected period of time. The fired test pads are thereafter compressed to half of their original thickness and allowed to rebound. The amount of rebound is measured as percent recovery of the compressed thickness of the pad. Compression recovery was measured after exposure to use temperatures of 1260° C. for 24 hours and 168 hours, and 1400° C. for 24 hours and 168 hours.

Fiber Dissolution

The inorganic fiber is non-durable or non-biopersistent in physiological fluids. By "non-durable" or "non-biopersistent" in physiological fluids it is meant that the inorganic fiber at least partially dissolves or decomposes in such fluids, such as simulated lung fluid, during in vitro tests described below.

The biopersistence test measures the rate at which mass is lost from the fiber ($ng/cm^2$-hr) under conditions which simulate the temperature and chemical conditions found in the human lung. In particular, the fibers exhibit low biopersistence in Simulated Lung Fluid at a pH of about 7.4.

To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 µm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 $ng/cm^2$-hr are considered indicative of a non-biopersistent fiber.

Table I shows fiber melt chemistries for comparative and inventive fiber samples.

TABLE I

| Example | $SiO_2$ wt % | MgO wt % | $Al_2O_3$ wt % | MnO wt % | CoO wt % |
|---|---|---|---|---|---|
| *C1 | 78.5 | 18.8 | 1.84 | 0 | 0 |
| 2 | 78.0 | 18.7 | 2.1 | 0.85 | 0 |
| 3 | 78.4 | 18.5 | 1.1 | 1.70 | 0 |
| 4 | 78.7 | 19.0 | 1.2 | 0 | 0.84 |
| 5 | 79.0 | 18.2 | 1.2 | 0 | 1.30 |
| 6 | 78.5 | 16.0 | 1.1 | 0 | 4.15 |

*Magnesium silicate fiber commercially available from Unifrax I LLC (Tonawanda, NY, USA) under the designation ISOFRAX.
C = Comparative Table II shows the results for shrinkage for the fibers after exposure to 1260° C. and 1400° C. for 24 hours.

TABLE II

| Example | Linear Shrinkage 1260° C. 24 hours % | Linear Shrinkage 1400° C. 24 hours % |
|---|---|---|
| C1 | 7.8 | 10.0 |
| 2 | 4.7 | 9.1 |
| 3 | 3.7 | 5.5 |
| 4 | 3.3 | 4.7 |
| 5 | 3.5 | 4.4 |
| 6 | 4.0 | 5.0 |

Table II shows that a magnesium-silicate inorganic fiber composition including manganese oxide or cobalt oxide as a component of the fiberization product results in lower linear shrinkage at both 1260° C. and 1400° C. as compared to magnesium-silicate inorganic fiber without the intended manganese oxide or cobalt oxide additions.

The Illustrative Examples comprising manganese oxide (examples 2 and 3) exhibited, on average, approximately 46% lower linear shrinkage at 1260° C. for 24 hours, as compared to Comparative Example 1. The Illustrative Examples comprising manganese oxide (examples 2 and 3) exhibited, on average, approximately 27% lower linear shrinkage at 1400° C. for 24 hours, as compared to Comparative Example 1.

The Illustrative Examples comprising cobalt oxide (examples 4-6) exhibited, on average, approximately 116% lower linear shrinkage at 1260° C. for 24 hours, as compared to Comparative Example 1. The Illustrative Examples comprising cobalt oxide (examples 4-6) exhibited, on average, approximately 112% lower linear shrinkage at 1400° C. for 24 hours, as compared to Comparative Example 1.

Table III shows the results compression recovery after exposure to 1260° C. and 1400° C. for 24 hours, and solubility for the fibers of Table I:

TABLE III

| Example | Compression Recovery 1260° C. 24 hours % | Compression Recovery 1400° C. 24 hours % | Solubility (k) ng/cm2 hr |
|---|---|---|---|
| C1 | 32 | 8 | 400 |
| 2 | 72 | 42 | 1099 |
| 3 | 69 | 42 | 1047 |
| 4 | 60 | 20 | * |
| 5 | 63 | 18 | * |
| 6 | 65 | 9 | 879 |

* The solubility of these fiber compositions was not tested.

Table III shows that a magnesium-silicate inorganic fiber composition including manganese oxide or cobalt oxide as a component of the fiberization product results in an improvement in compression recovery at both 1260° C. and 1400° C., as compared to magnesium-silicate inorganic fiber without the intended manganese oxide or cobalt oxide additions.

The Illustrative Examples comprising manganese oxide (examples 2 and 3) exhibited, on average, approximately 97% higher compression recovery at 1260° C. for 24 hours, as compared to Comparative Example 1. The Illustrative Examples comprising manganese oxide (examples 2 and 3) exhibited, on average, approximately 95% higher compression recovery at 1400° C. for 24 hours, as compared to Comparative Example 1.

The Illustrative Examples comprising cobalt oxide (examples 4-6) exhibited, on average, approximately 120% higher compression recovery at 1260° C. for 24 hours, as compared to Comparative Example 1. The Illustrative Examples comprising manganese oxide (examples 2 and 3) exhibited, on average, approximately 425% higher compression recovery at 1400° C. for 24 hours, as compared to Comparative Example 1.

The Illustrative Examples comprising manganese oxide (examples 2 and 3) exhibited, on average, approximately 168% higher solubility, as compared to the Comparative Example 1. Illustrative Example 6 comprising cobalt oxide exhibited approximately 120% higher solubility as compared to Comparative Example 1.

The magnesium-silicate inorganic fiber composition including a manganese oxide and/or cobalt oxide as a component of the fiberization product exhibits an average compression recovery after exposure to 1260° C. for 24 hours of at least 60%.

While the inorganic fiber, thermal insulation, methods of preparing the inorganic fiber, and method of insulating articles using the thermal insulation have been described in connection with various embodiments, it is to be understood that other similar embodiments may be used or modifications and additions may be made to the described embodiments for performing the same function. Furthermore, the various illustrative embodiments may be combined to produce the desired results. Therefore, the inorganic fiber, thermal insulation, methods of preparing the inorganic fiber, and method of insulating articles using the thermal insulation should not be limited to any single embodiment, but rather construed in breadth and scope in accordance with the recitation of the appended claims. It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The invention claimed is:

1. An inorganic fiber comprising a fiberization product of silica, 12 to 35 weight percent magnesia, 0.1 to 10 weight percent of at least one compound containing an element from group IX of the periodic table, and optionally at least one compound containing an element from group VII of the periodic table, alumina and/or boria.

2. The inorganic fiber of claim 1, wherein said inorganic fiber comprises substantially no alkali metal oxide.

3. The inorganic fiber of claim 1, wherein said inorganic fiber comprises 1 weight percent or less iron oxide, measured as $Fe_2O_3$.

4. The inorganic fiber of claim 1, wherein said inorganic fiber comprises 1 weight percent or less calcia.

5. The inorganic fiber of claim 1, wherein said inorganic fiber exhibits a shrinkage of 4% or less after exposure to a temperature of 1260° C. for 24 hours.

6. The inorganic fiber of claim 1, wherein said inorganic fiber exhibits a shrinkage of 5% or less after exposure to a temperature of 1400° C. for 24 hours.

7. The inorganic fiber of claim 1, wherein said inorganic fiber comprises the fiberization product of 65 to 86 weight percent silica, 12 to less than 35 weight percent magnesia, 0.1 to 10 weight percent of at least one compound containing an element from group IX of the periodic table, and optionally at least one compound containing an element from group VII of the periodic table, alumina and/or boria.

8. The inorganic fiber of claim 7, wherein said at least one compound containing an element from group IX of the periodic table comprises cobalt oxide.

9. The inorganic fiber of claim 7, wherein said inorganic fiber comprises the fiberization product of 70 to 82 weight percent silica, 16 to 22 weight percent magnesia, and 0.1 to 10 weight percent of cobalt oxide.

10. The inorganic fiber of claim 7, wherein said inorganic fiber comprises the fiberization product of 72 to 82 weight percent silica, 16 to 22 weight percent magnesia, and 0.1 to 5 weight percent of cobalt oxide.

11. The inorganic fiber of claim 7, wherein said inorganic fiber comprises the fiberization product of 72 to 82 weight percent silica, 12 to 22 weight percent magnesia, and 0.1 to 3 weight percent of cobalt oxide.

12. The inorganic fiber of claim 7, wherein said inorganic fiber comprises the fiberization product of 70 to 82 weight percent silica, 12 to 22 weight percent magnesia, and 0.5 to 5 weight percent of cobalt oxide.

13. The inorganic fiber of claim 7, wherein said inorganic fiber comprises the fiberization product of 72 to 82 weight percent silica, 12 to 22 weight percent magnesia, and 1 to 5 weight percent of cobalt oxide.

14. The inorganic fiber of claim 7, wherein said inorganic fiber comprises the fiberization product of 72 to 82 weight percent silica, 12 to 22 weight percent magnesia, and 1.25 to 5 weight percent of cobalt oxide.

15. The inorganic fiber of claim 7, wherein said inorganic fiber comprises the fiberization product of 70 to 82 weight percent silica, 12 to 22 weight percent magnesia, and 1.5 to 5 weight percent of cobalt oxide.

16. The inorganic fiber of claim 7, wherein said at least one compound containing an element from group VII of the periodic table comprises manganese oxide.

17. The inorganic fiber of claim 7, wherein said inorganic fiber comprises the fiberization product of 72 to 82 weight percent silica, 16 to 22 weight percent magnesia, 0.1 to 5 weight percent of cobalt oxide, and 0.1 to 5 weight percent of manganese oxide.

18. The inorganic fiber of claim 7, wherein said inorganic fiber comprises the fiberization product of 72 to 82 weight percent silica, 12 to 22 weight percent magnesia, 0.1 to 3 weight percent of cobalt oxide, and 0.1 to 3 weight percent of manganese oxide.

19. The inorganic fiber of claim 7, wherein said inorganic fiber comprises the fiberization product of 70 to 82 weight percent silica, 12 to 22 weight percent magnesia, 0.5 to 5 weight percent of cobalt oxide, and 0.5 to 5 weight percent of manganese oxide.

20. The inorganic fiber of claim 7, wherein said inorganic fiber comprises the fiberization product of 72 to 82 weight percent silica, 12 to 22 weight percent magnesia, 1 to 5 weight percent of cobalt oxide, and 1 to 5 weight percent of manganese oxide.

21. The inorganic fiber of claim 7, wherein said inorganic fiber comprises the fiberization product of 72 to 82 weight percent silica, 12 to 22 weight percent magnesia, 1.25 to 5 weight percent of cobalt oxide, and 1.25 to 5 weight percent of manganese oxide.

22. The inorganic fiber of claim 7, wherein said inorganic fiber comprises the fiberization product of 70 to 82 weight percent silica, 12 to 22 weight percent magnesia, 1.5 to 5 weight percent of cobalt oxide, and 1.5 to 5 weight percent of manganese oxide.

* * * * *